W. HENRY.
BLANK REVERSING MECHANISM FOR GLASS MOLDS.
APPLICATION FILED JAN. 31, 1912.
1,046,185.
Patented Dec. 3, 1912.
2 SHEETS—SHEET 1.
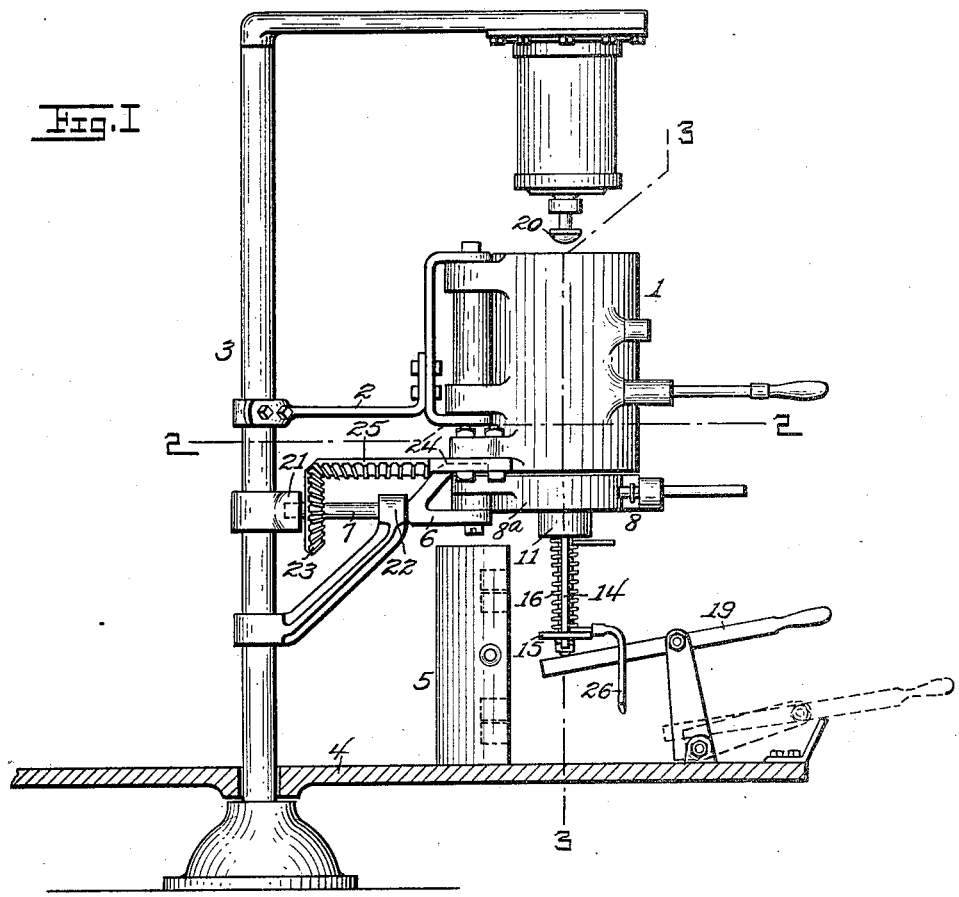
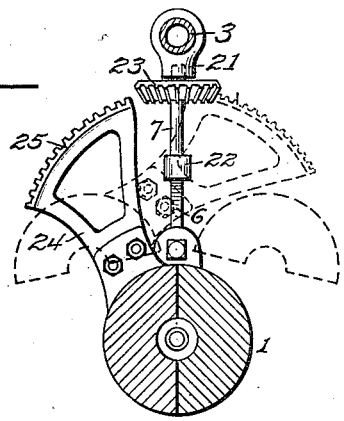
WITNESSES:
F. E. Arthur
Bruce Morris
INVENTOR—
William Henry,
BY
H. E. Dunlap
ATTORNEY.

W. HENRY.
BLANK REVERSING MECHANISM FOR GLASS MOLDS.
APPLICATION FILED JAN. 31, 1912.
1,046,185.
Patented Dec. 3, 1912.
2 SHEETS—SHEET 2.
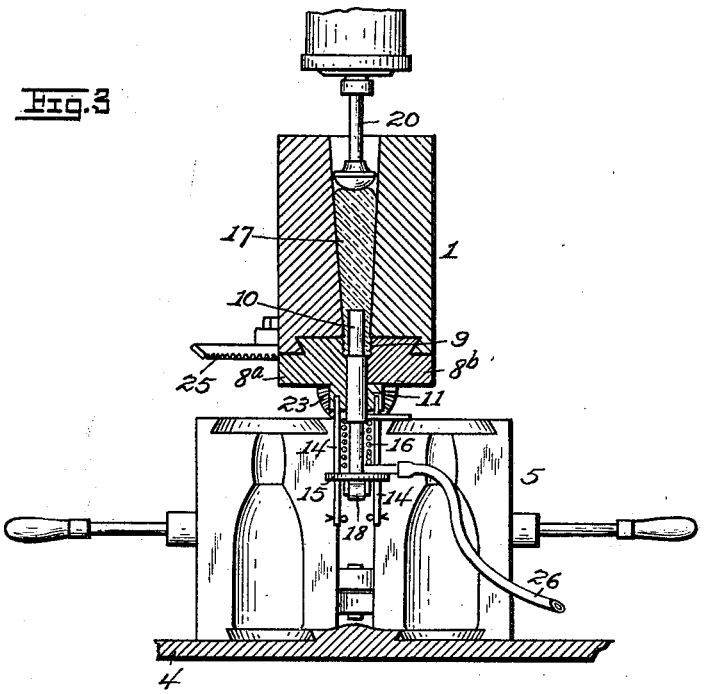
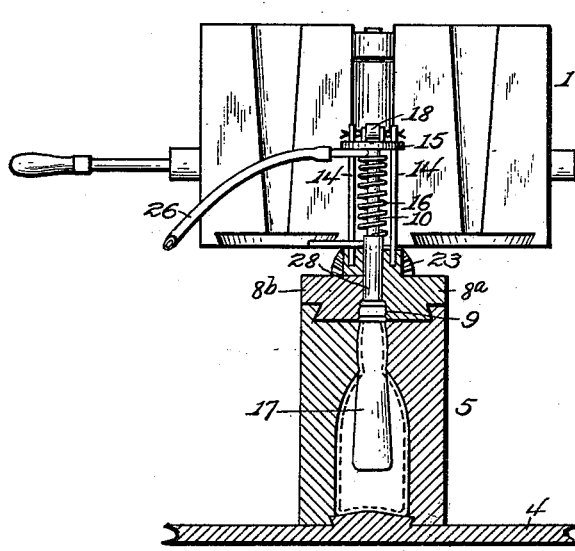
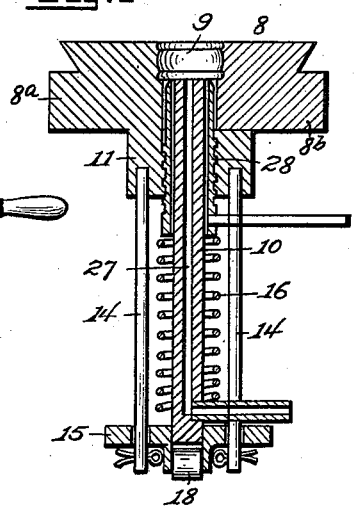
WITNESSES:
F. E. Arthur,
Bruce Morris.
INVENTOR—
William Henry.
BY
N. E. Dunlap,
ATTORNEY.

UNITED STATES PATENT OFFICE.

WILLIAM HENRY, OF WELLSBURG, WEST VIRGINIA.

BLANK-REVERSING MECHANISM FOR GLASS-MOLDS.

1,046,185.

Specification of Letters Patent.

Patented Dec. 3, 1912.

Application filed January 31, 1912. Serial No. 674,535.

*To all whom it may concern:*

Be it known that I, WILLIAM HENRY, a citizen of the United States of America, and resident of Wellsburg, county of Brooke, and State of West Virginia, have invented certain new and useful Improvements in Blank-Reversing Mechanism for Glass-Molds, of which the following is a specification.

This invention relates broadly to glass machines, and specifically to blank reversing mechanism for bottle molds and the like.

The primary object of the invention is to provide a press mold having means associated therewith whereby, when the mold is opened, the blank formed therein is automatically reversed and carried to its proper position in an underlying blow mold.

A further object is to provide a transfer ring and means for handling the same whereby the transfer of a glass blank from a press mold to a blow mold and the return of the ring to its initial position is automatically accomplished, resulting in the practical elimination of the labor involved in manually effecting such transfer and in a material increase in the production.

With these and other objects in view, the invention resides in the features of construction, arrangement of parts and combinations of elements which will hereinafter be exemplified, reference being had to the accompanying drawings, forming a part of this specification, in which—

Figure 1 is a side elevation of the invention, the rotary table carrying the blow molds being shown in section; Fig. 2 is a horizontal section on the line 2—2, Fig. 1; Fig. 3 is a vertical section on the line 3—3, Fig. 1, showing the press mold closed in blank forming position and the blow mold open; Fig. 4 is a similar section showing the press mold open and the blow mold closed with the blank reversed and received therein; and Fig. 5 is an enlarged vertical section of the plunger mechanism.

Referring to said drawings, in which like designating characters distinguish like parts throughout the several views—1 indicates generally a two-part press mold of a common hinged type having suitable means of support, as a supporting arm or bracket 2 carried by a post or pedestal 3. A table 4 is rotatable about said post or pedestal and has mounted thereon blow molds 5 of an ordinary two-part hinged type adapted to be successively moved into a position underlying said press mold, as shown.

Since the illustration of a single blow mold will suffice in arriving at a clear understanding of the present invention, but one is herein shown.

Pivotally mounted upon the bracket-like end 6 of a rotary horizontal shaft 7 is a transfer ring 8 comprising two hinged sections 8ª and 8ᵇ having complemental bottle-neck-forming recesses 9 therein and adapted for having a plunger 10 operate centrally therethrough. One of the sections, as 8ª, has formed integral therewith on its face an extended boss-like lip 11 which is provided with a central aperture alining with the plunger passage in the body of the ring. Fixed at diametrically opposite points in the face of said lip are the ends of two parallel vertical posts 14 which serve as guides for a flanged collar 15 fixed upon the outer end of a plunger 10 which has its opposite end slidably supported in said central aperture. A coil spring 16 encircles the plunger, having one end seated against the collar 15 and the other against a suitable fixed bearing surface whereby said plunger is normally maintained in a retracted position with respect to a blank 17 formed in the press mold. An anti-friction roller 18 suitably mounted at the outer end of the plunger is adapted to be engaged by suitable plunger operating means, as by a lever 19, when it is desired to elevate the same for forming an air pocket in the blank, as shown in Fig. 3. A suitably operated compress plunger 20 is preferably lowered simultaneously with the operation of said plunger for compressing the molten glass in the blank forming process, as is clearly shown in Fig. 3.

Fixed on the shaft 7, which is rotatable in appropriate bearings 21 and 22, is a gear wheel 23; and fixed to one of the movable sections of the press mold is a horizontally disposed arm or bracket 24 which carries upon its end an arcuate rack segment 25 which is adapted to be moved into operative engagement with said gear wheel when said section is swung outward in opening the mold. As is obvious, outward swinging movement of said mold section, beyond the point where the rack-bar or segment 25 first engages the gear wheel, acts to rotate the shaft 7 upon which said wheel is mounted and, consequently, to swing laterally the transfer ring 8, the plunger mechanism carried by said ring, and the blank 17 formed in said mold and supported by said ring, the purpose being to reverse the blank to an upright position within the blow-mold 5 located directly beneath said press-mold, it being of course understood that said blow-mold is in open position, as shown in Figs. 1 and 3, for the reception of the blank.

In order to provide for the free and unobstructed lateral movement of the transfer ring and the blank to reverse position, as above indicated, the press-mold sections must be opened sufficiently to clear said ring before rotation begins; hence the rack-segment is so positioned on the one section of the mold that it does not engage the gear wheel until said clearance has been effected.

When the blank has been reversed, as described, the blow mold is closed, as shown in Fig. 4, and the blowing operation is performed in the usual manner, air being admitted from a suitable source through a flexible connection, as a hose 26, to and through a passage 27 provided in the plunger 10. At the conclusion of the blowing operation, both the blow-mold and the transfer ring are opened, whereupon the ring and associated parts may be automatically returned to their initial position by closing of the press mold.

The usual mouth-shaping sleeve 28, located in threaded engagement with the transfer ring and embracing a portion of the plunger, is preferably employed in the manner well known to those skilled in the art.

From the foregoing it will be seen that I provide extremely simple and efficient means whereby the opening and closing of the press or blank mold automatically effects movement of the transfer ring to and from a reversed position, resulting in a material saving in time and labor.

Having thus described my invention, what I claim as new, and desire to secure by Letters Patent, is—

1. The combination with a suitably supported blank-forming mold, of a rotary shaft, a transfer ring carried by said shaft and adapted to coöperate with said mold, and means controlled by opening and closing movements of said mold whereby said shaft is rotated to reverse the position of said ring and to return said ring to initial position, respectively.

2. The combination with a suitably supported blank-forming mold, of a rotary member, a transfer ring carried by said member and adapted to coöperate with said mold, and means controlled by movement of the mold sections from and to closed position whereby said chamber is rotated to reverse said ring and to return the same to initial position, respectively.

3. The combination with a blank-forming mold, of a blow-mold located beneath said blank-forming mold at a spaced distance therefrom, a rotary shaft, a transfer ring carried by said shaft, and means controlled by opening movement of said blank-forming mold whereby said shaft is rotated to produce the reversal of said ring for depositing a blank in a position to be embraced by said blow mold, said means being actuated to return said ring to initial position by closing movement of said blank-forming mold.

4. The combination with a blank-forming mold, of a transfer ring associated therewith, a support for said ring, and coöperative means carried by said mold and by said support whereby opening of the former effects a partial rotation of the latter for reversing the position of the ring.

5. The combination with a supporting member, of a sectional blank-forming mold carried thereby, a transfer ring in coöperative relation to said mold, a rack-bar carried by one of the movable sections of said mold, and means controlled by movement of said rack-bar whereby partial rotation of said transfer ring is effected.

6. The combination with a supporting member, of a sectional blank-forming mold carried thereby, a rotary shaft, a transfer ring carried by said shaft, a gear wheel operatively associated with said shaft, a rack-bar carried by one of the mold sections, said rack-bar being actuated by movement of said mold section to rotate said gear wheel and shaft for reversing the position of said transfer ring.

7. The combination with a supporting member, of a sectional blank-forming mold carried thereby, a rotary shaft, a transfer ring carried by said shaft, a gear wheel operatively associated with said shaft, an arcuate rack segment carried by one of the mold sections, said segment being actuated by movement of said section to rotate said gear wheel and shaft for reversing the transfer ring.

8. The combination with a supporting member, of a sectional blank-forming mold carried thereby, a rotary shaft, a transfer ring carried by said shaft, a gear wheel operatively associated with said shaft, an arcuate rack segment carried by one of the mold sections, said segment being actuated by movement of said section to rotate said gear wheel and shaft for reversing the transfer ring, said segment being supported at an angle to said shaft when the mold is in closed position, permitting partial opening of said mold prior to engagement of said segment with said gear wheel.

9. The combination with a supporting member, of a sectional blank-forming mold carried thereby, a transfer ring in coöperative relation to said mold, a rack-bar carried by one of the movable sections of said mold, and means controlled by movement of said rack-bar whereby partial rotation of said transfer ring is effected, said rack-bar and said means being so disposed relatively as to permit partial opening of said mold prior to actuation of said transfer ring.

In testimony whereof I affix my signature in presence of two subscribing witnesses.

WILLIAM HENRY.

Witnesses:
 EDMUND C. WHITEHEAD,
 H. E. DUNLAP.